United States Patent [19]
Ast

[11] Patent Number: 5,893,309
[45] Date of Patent: Apr. 13, 1999

[54] METHOD FOR CUTTING BLOCKS OF FIBROUS MATERIAL FOR RECOMPRESSION

[76] Inventor: Don R. Ast, 23283 Hubbard Cutoff Rd. NE., Aurora, Oreg. 97002

[21] Appl. No.: 08/947,008

[22] Filed: Oct. 8, 1997

[51] Int. Cl.$^6$ .................................................. B26D 3/18
[52] U.S. Cl. .................. 83/35; 83/404.2; 100/39; 100/3; 241/605; 29/426.2
[58] Field of Search ................... 83/35, 23, 404.2, 83/404.4, 408, 412, 425, 427, 808, 39, 43, 44, 45; 241/605; 53/492, 381.2; 100/96, 97, 39

[56] References Cited

U.S. PATENT DOCUMENTS

| | | | |
|---|---|---|---|
| 3,612,127 | 10/1971 | Beno | 146/70.1 |
| 3,618,649 | 11/1971 | Beno | 146/70.1 |
| 4,090,440 | 5/1978 | Jensen | 100/3 X |
| 4,158,994 | 6/1979 | Jensen | 100/3 |
| 4,334,466 | 6/1982 | Spiegelberg | 100/3 X |
| 4,336,732 | 6/1982 | Liet et al. | 83/109 |
| 4,341,354 | 7/1982 | Liet et al. | 241/101.7 |
| 4,676,153 | 6/1987 | Ast | 100/3 X |
| 4,718,335 | 1/1988 | Ast | 100/3 |
| 4,771,670 | 9/1988 | Woerman | 83/861 |
| 4,805,528 | 2/1989 | Rogers et al. | 100/3 |
| 4,909,139 | 3/1990 | Montano et al. | 83/404.2 X |
| 4,929,141 | 5/1990 | Keesey et al. | 414/412 |
| 5,001,974 | 3/1991 | Gombos | 100/4 |
| 5,017,399 | 5/1991 | Montano et al. | 426/636 |
| 5,099,755 | 3/1992 | Montano et al. | 83/404.2 X |
| 5,175,981 | 1/1993 | Gombos et al. | 53/502 |
| 5,249,350 | 10/1993 | Callahan | 29/426.2 |
| 5,343,670 | 9/1994 | Gombos et al. | 53/399 |
| 5,718,157 | 2/1998 | Hawley et al. | 83/155 |

Primary Examiner—Rinaldi I. Rada
Assistant Examiner—John C. Wegand
Attorney, Agent, or Firm—Frank J. Dykas

[57] ABSTRACT

A method of cutting a block of fibrous material for further recompression from a rectangular bale of fibrous material in which the bale is first positioned with the string side up. Slabs are cut from the bale generally parallel to the longitudinal axis and between parallel wrappings of baling twine to form a cut slab of predetermined width which is still wrapped with baling twine. The cut slab is laid over on to its side, the baling twine is removed from the slab, and the slab is cut into suitable sized pieces for recompression wherein the stems and grass blades are oriented generally parallel to each other but vertical and transverse to a longitudinal center line of the cut block.

2 Claims, 4 Drawing Sheets

METHOD FOR CUTTING BLOCKS OF FIBROUS MATERIAL FOR RECOMPRESSION

BACKGROUND OF THE INVENTION

1. Technical Field

This invention relates to the handling of large bales of fibrous material, and more particularly to a means for cutting large hay, grass or straw bales into smaller sectional blocks sized appropriately for recompression or rebating for the export market, and those domestic consumers who cannot utilize the larger bales.

2. Background

Hay and other forages for feeding and bedding animals must often be transported over great distances from the place of production to the location of the animals. It is not uncommon to ship large quantities of hay and straw to dairies, feed lots, or race tracks located near or in metropolitan areas, and to other locations to where hay, grass and straw cannot be grown, or where there is limited availability of land on which to grow hay, grass and straw.

For purposes of this disclosure, the term "hay" will be used in a generic sense to describe normal hay, such as that made from alfalfa, grasses used as feed, and straw. Hay is typically harvested in the United States by use of hay balers, either the type which produce rectangular bales or round bales. The use of rectangular bales is by far the most common method of harvesting hay. An important reason for this is that rectangular bales can be easily stacked, one atop the other, whereas round bales are not so readily stacked. These bales are constructed of a pre-determined size by the bale machines within a certain normal range of densities. In determining the density of the hay in the standard field bale, consideration is given to optimizing storage life, optimizing food value of the product, minimizing damage through high or low moisture content, and the actual weight of the bale that has to be manually handled by the farmer, dairyman, or those with pleasure animals.

A traditional standard field bale is shown representationally in prior art FIG. 1. It has three distinctly different sets of sides, as shown in prior art FIG. 1. These are traditionally known as the cut sides, string sides, and ends. The difference in the sides, particularly between the cut sides and the string sides, is the inherent result of the baling process. In the baling process, blades and stems of hay, grass or straw are picked up from a windrow in the field, where the material has been left to dry, and transported up and into a baling chamber. Stems or blades of the hay, grass or straw lie, as it arrives in the baling chamber, are generally aligned perpendicular to the longitudinal axis of the baling machine. A platen set to one side of the baling chamber periodically presses the accumulating hay transversely into a bale forming chamber. Cutter knives are used at one end of the baling chamber to clip off the incoming hay as the platen pushes the collected hay into the bale forming chamber. In this manner there are created a pair of horizontally oriented opposing cut sides, and a pair of vertically oriented string sides wherein the stalks, stems, strands and blades of the fibrous material lie generally parallel to each other.

Once the bale is formed, it has to be wrapped with twine around the string sides where the fibrous material lies in a parallel array. If the string were wrapped around the cut sides, the bale would fall apart upon being ejected from the baling machine.

Standard field bales are stored in hay stacks. Care is taken to manipulate the bales as they are either manually or mechanically retrieved from the field and formed into the stacks to insure that the string sides on the top and bottom, with the bale resting on one string side. There are a number of reasons for this, including the fact that the string sides absorb much less moisture and provide a much better protective barrier from spoilage when exposed to the elements than do the cut sides. If a bale is stored cut side up, it absorbs water and spoils much more rapidly. Also, the standard field bales, typically weighing 80 lbs. to 120 lbs., are intended, at some point in time, to be manually handled. Storing them string side up gives the farmer or dairyman the strings as handles for picking up and moving the bale.

It is uneconomical and impractical to ship standard field bales overseas, or even across great land differences. The freight costs, because of the low density and high volume, become prohibitive. Therefore, a number of methods have been developed to increase the density of the hay/straw so as to minimize freight costs. The two most common methods are first to chop the hay and compress it into pellets or cubes which are approximately one inch square, and the second method is to recompress the original bale to approximately one-half its original volume, retie it, and stack the recompressed bales into standardized dry cargo ocean freight containers or railway freight cars, which can then be transported-by ship or rail.

Examples of recompression machines and methods of using them are shown in U.S. Pat. No. 4,676,153 and U.S. Pat. No. 4,718,335, both to Gene Ast. The recompressed bales in the prior art are retied in the same direction as the string wraps of standard field bales from which they were made, that is to say, around the string sides of the original bale. This is because the fibrous material of the recompressed bale still lies in the same general orientation that it did in the standard field bale, and given the tremendous recoil forces of the recompressed bale attempting to re-expand, if they were tied around the cut sides as opposed to string sides, the recompressed bale would likely burst, or at least an unacceptably high percentage of them would burst once free of the recompression press. A standard recompression press in commercial use today will recompress approximately 200 tons of fibrous material in a 24-hour period of time. Even at a 5% bursting rate, and it would most likely be much higher, this would result in 10 tons of burst bales and loose hay at the pressing site for each day of operation. This would be unacceptable. For this reason, the conventional prior art wisdom has been to always recompress standard field bales and retie them in the same direction as they were originally tied.

While standard field bales have been used for the recompression process, large hay growing operations have increasingly favored the "big bale" for the harvesting operation. These bales run in size anywhere from 800 to 2,000 lbs. The big bale format is preferred, simply because it is far more economical to handle these bales with automated equipment. Thus, it follows that the big bale format would be preferred in the recompression business for the same reasons. The big balers presently available for baling field crops into big bales are in the following sizes: 38"×48"×96"; 48"×50"×96"; 32"×38"×96", 28"×48"×96"; and 32"×34"×98".

The baling machines used to form the big bales generally operate on the same principles as the traditional standard field baler. The material to be baled is picked up from the windrow into a baling chamber, and pushed by a platen into a bale forming chamber. The big bales are wrapped with twine, in the same general manner as are the standard field bales, except that typically six equidistantly spaced wraps of twine are used as opposed to two or three for the standard field bale. There is a significant difference in how these bales are handled and stored, and that is, unlike the standard field bale which is handled string side down, the big bale is usually handled and stored cut side down. There is a reason for this. While there are competing interests, generally speaking, in the prior art, big bales are handled and stored cut side up as opposed to string side up. The most common reason for doing this is that they weigh so much that they cannot be handled manually. Equipment must be used to move the bales, and the most common equipment for picking up and moving a big bale is a fork lift truck equipped with side squeezes as opposed to standard bottom forks. The side squeezes are used to clamp on to the sides of the bale and hold it while it is being lifted, lowered, or otherwise moved around. If the big bales are stored string side out, then the fork lift squeeze breaks the string while the fork is sliding between the bales resulting in broken twine and burst bales.

The typical dimensions for a standard field bale, which may vary, are usually 16" high ×17" wide ×48" long. For purposes of this specification, in both the prior art and detailed description, a long bale with dimensions of 50" high ×48" wide ×96" long will be used. However, it should be apparent that the principles disclosed are applicable to other sizes of large bales.

The commercial recompression machines in use today are designed to accept and recompress standard field bales. If the source of supply of fibrous material to be recompressed is in the form of a large bale, the large bale must first be cut into blocks equivalent in both density and size to the standard field bale.

As shown in prior art FIGS. 2 and 3, in the prior art, large bales are cut to recompression size by means of either a sickle or a chain saw. In the prior art, great care was taken to manipulate the large bale and the pieces thereof, as they are cut, so as to create field bale size blocks of fibrous material, oriented as in the same position as would be a standard field bale about to be recompressed. That is to say, the cut blocks are oriented so that the fibrous material is oriented to be the equivalent of what would be a string side up standard field bale about to be recompressed.

This is shown representationally in FIGS. 2 and 3. As can be seen, the big bale from which a slab has been cut, if handled as usual, string side up, has to be reoriented cut side up so as to place the string on the sides, with the parallel orientation of the stalks and blades of the fibrous material in a more or less vertical, parallel, orientation. The strings of the baling twine must then be removed prior to cutting off a slab which, when laid down, is 16" high ×52" wide ×96" long. The slab is then cut into three sections or blocks, each of which have dimensions of 16" high ×17" wide ×96" long.

In using this prior art method, as can be seen, the ultimate result is the fibrous material lies in an orientation equivalent to that of a standard field bale with its string side up.

There are two problems with this prior art method. The first is that the big bale must be reoriented from its string side down position to its cut side down position prior to cutting the slabs. This is an extra handling step, and requires stoutly built machinery to pick up and rotate a 2,000 lb. bale. The second problem is that the strings must be removed from the bale prior to cutting the slabs. When this is done, typically in the prior art, the bale is first moved into and encased within a squeeze chute to hold the untied bale together as the slabs are being cut. Often times, the slabs being cut from the big bale will simply burst apart and the operator will find him or herself with 700 lbs. of loose hay representing a 16" slab cut from a 96" 2,000 lb. bale. Next, if the prior art slab remains intact as it is laid down on to a transport table for movement to a secondary cutting position where the slab is further cut into the blocks, it will often times simply burst apart during this operation.

The loose hay, in the prior art, and continuing today, must be collected and re-baled by a standard field baler located at the recompression cite, before reintroduction into the system. Breakage rates for large bales as they are cut into slabs in the prior art, are unacceptable for commercial production.

What is needed is a method of cutting large bales into smaller blocks which can then be recompressed without breakage or disintegration of the blocks of fibrous material prior to its recompression.

DISCLOSURE OF INVENTION

A typical big bale. Usually with six wraps of baling twine, is placed on a receiving station string side down and then transferred to a bale cutting station where a slab of the big bale is cut generally parallel to the longitudinal axis of the big bale between two preselected wraps of the baling twine. The slab is still wrapped with at least one wrap of baling twine and is laid over on to its side, and transported to a slab cutting station. The wraps of baling twine on the cut slab are then removed, and the slab is cut into blocks of appropriate size for use in a recompression machine. The blocks, as cut, have a fibrous material orientation wherein the stem, grass blade or other like properties are generally arranged parallel to each other and in a generally vertical and transverse orientation to the longitudinal axis of the cut block.

BEST MODE FOR CARRYING OUT INVENTION

Figure 1:
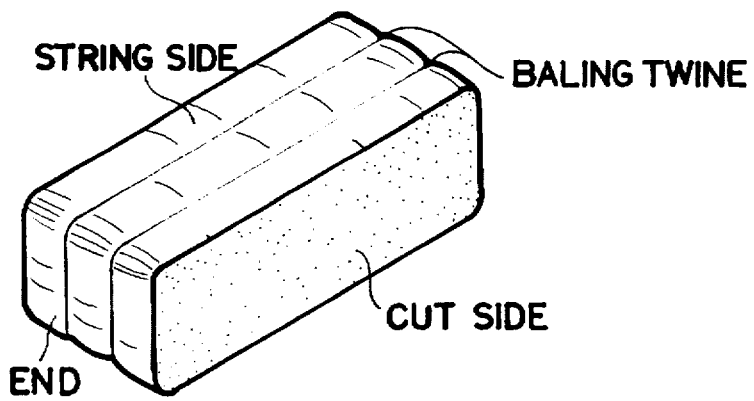
FIG. 1 is a perspective representational view of a standard prior art field bale.
Figure 2:
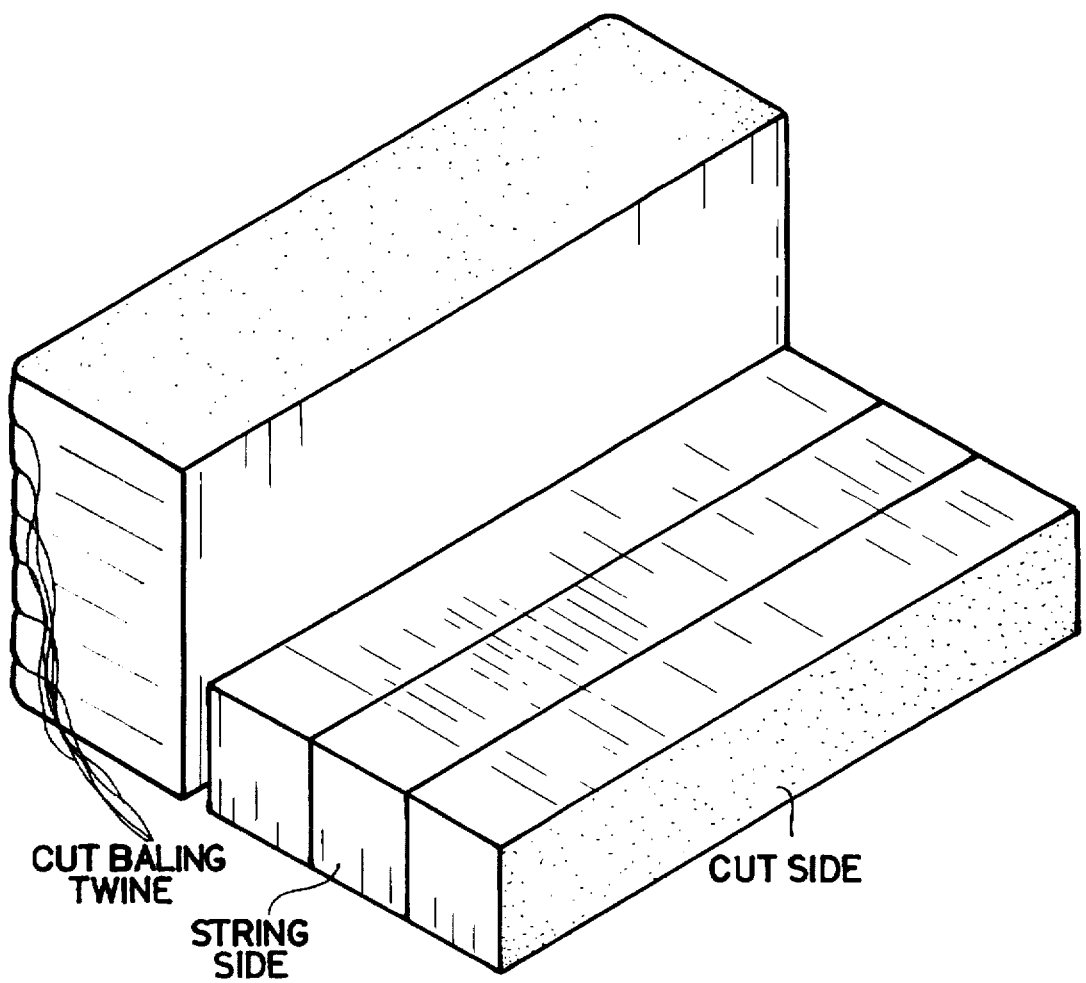
FIG. 2 is a perspective representational view of a prior art big bale with one slab cut off.
Figure 3:
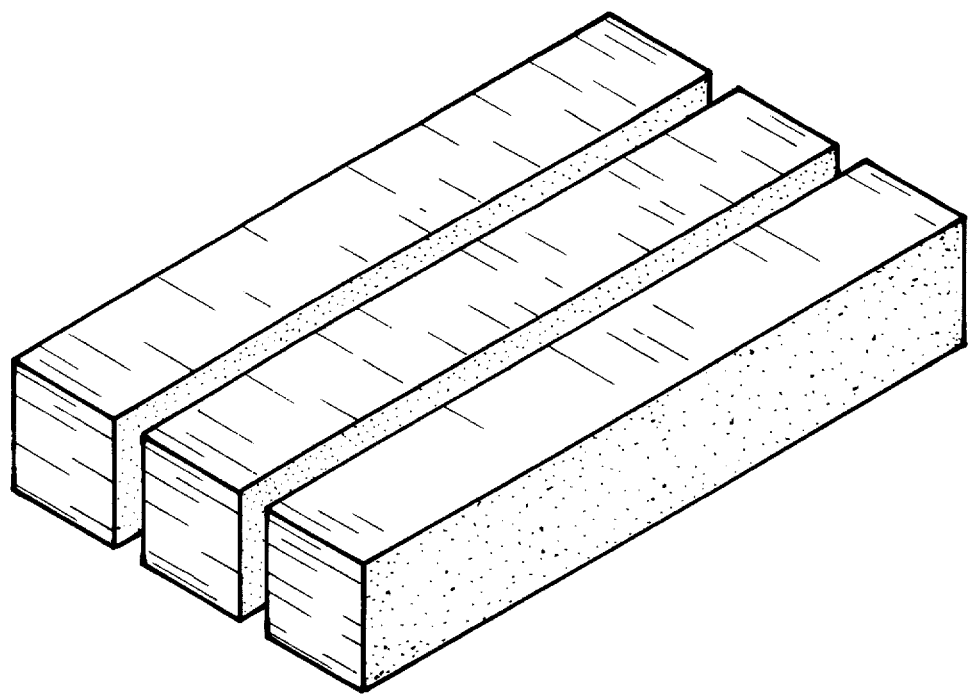
FIG. 3 is a perspective representational view of a prior art bale slab cut into three sections.
Figure 4:
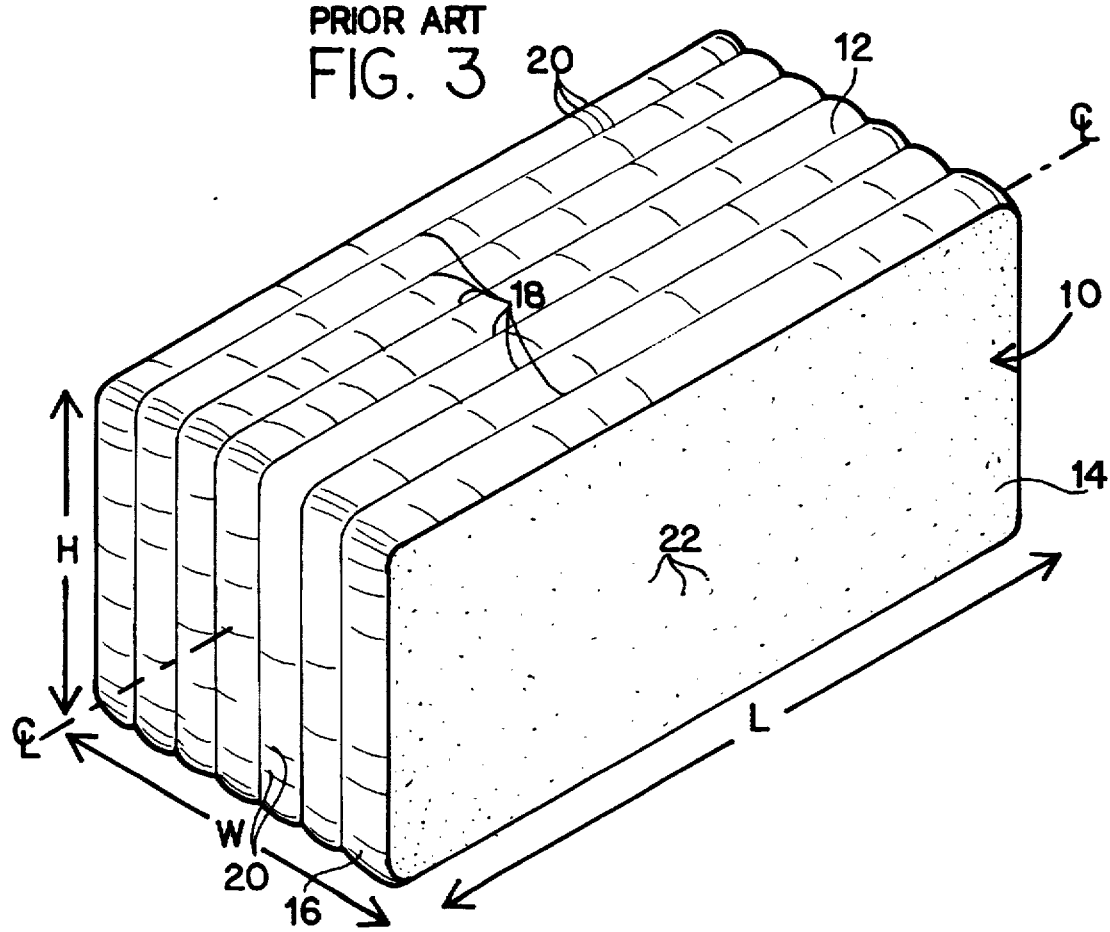
FIG. 4 is a perspective representational view of a big bale in a string side down orientation.
Figure 5:
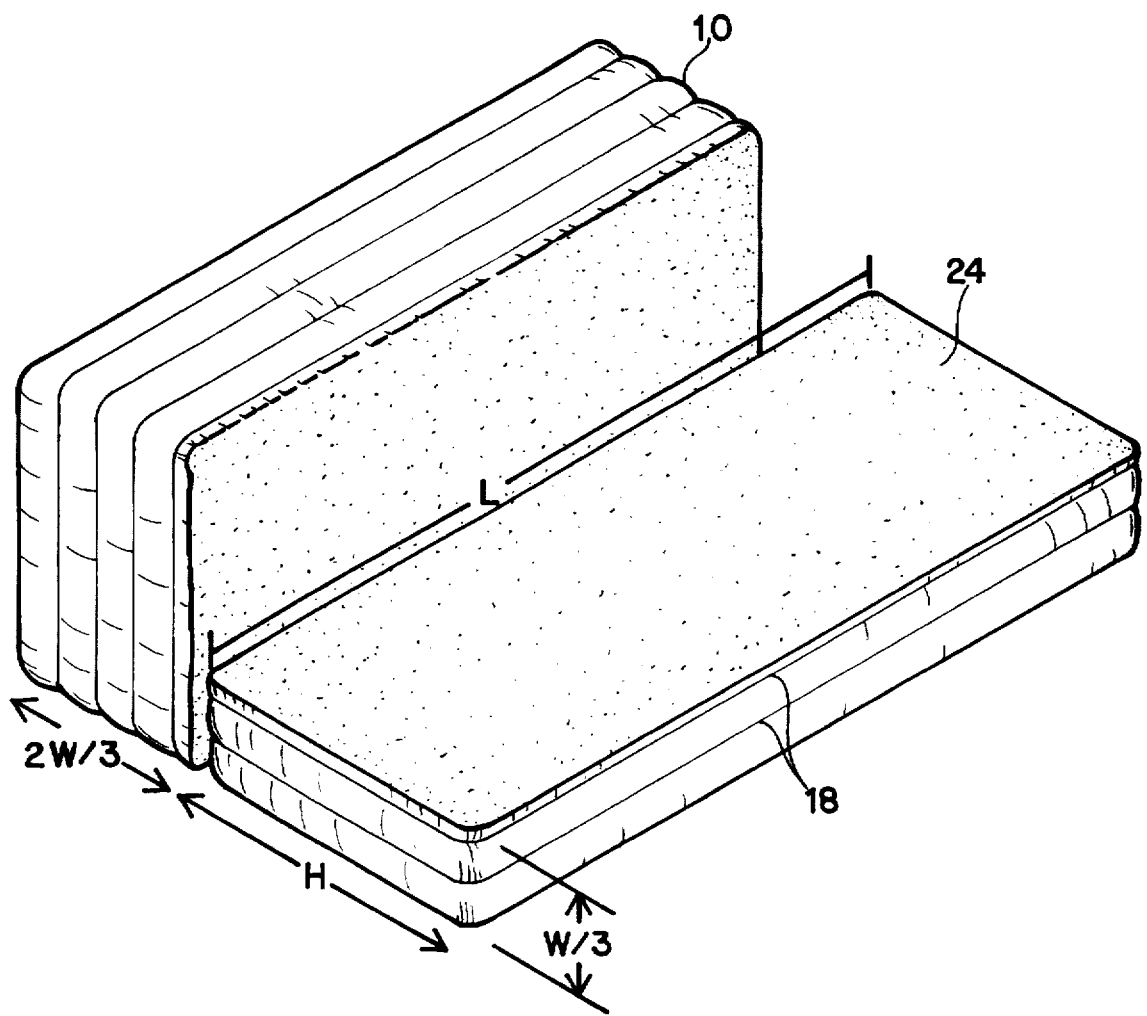
FIG. 5 is a perspective representational view of a big bale in a string side down orientation with one slab cut off.
Figure 6:
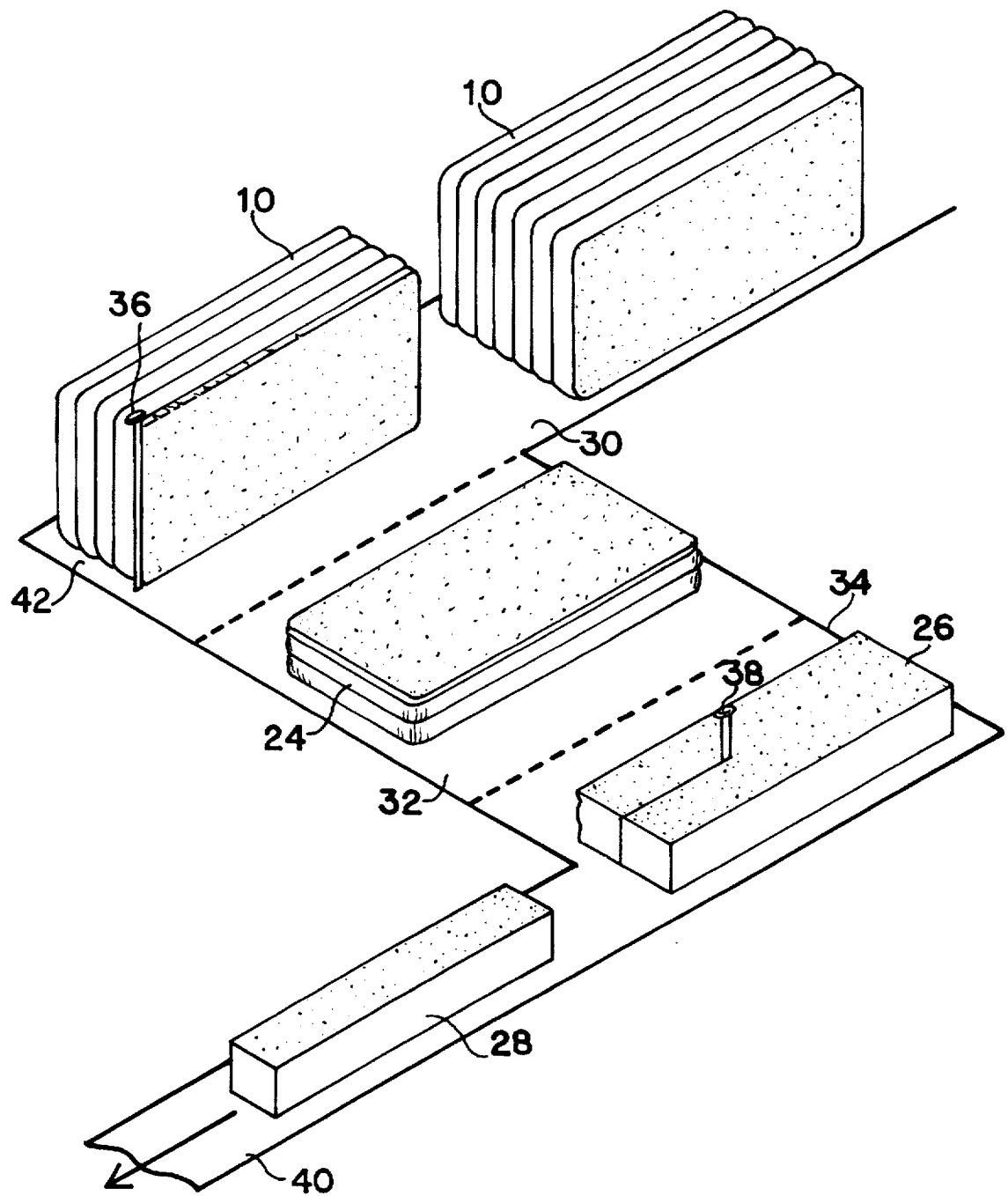
FIG. 6 is a simplified perspective representational view showing the new method of cutting a big bale.

Referring to FIGS. 4, 5 and 6, my new method of cutting a big bale is shown. A typical big bale 10 is shown intact in FIG. 4. As can be seen, big bale 10 is formed of cut sides 14, string sides 12, ends 16, and is held together, in the typical case, by six separate wraps of baling twine 18. The stem orientation on the string side and ends is shown representationally at 20, with the cut end stem orientationally shown representationally on the cut side 14 as 22. The bale is of a given length L, width W, and height H and has a longitudinal axis $C_L$.

FIG. 5, slab 24 has been cut from bale 10 and laid on its side. In the case where the width is sufficient to cut three slabs from the bale and the bale is wrapped with six strings of baling twine 18, then the first cut for the first slab cut will occur between the second and third baling twine wraps, and the second cut will occur between the fourth and the fifth baling twine wraps. If, for example, the bale has a width of 48", a height of 52", and a length L of 96", then cutting the bale into three slabs results in each slab having a height of W/3, or 16", a width equal to H, or 54", and a length L equal to 96". The two wraps of baling twine 18 on slab 24 hold the bale together as it is being cut, and laid over onto its side, and transported on transfer platform 32 to cutting station 34, as shown in FIG. 6. Once slab 24 has been transported to cutting station 34, the remaining baling twine wraps 18 on the slab are removed. As is shown in FIG. 6 for cut slab 26 which is being cut by chain saw cutting blade 38 into cut blocks 28 which are then transported on transport ramp 40 to the recompression machine (not shown). A typical recompression machine is showed and described in U.S. Pat. No. 4,676,153, to Gene Ast, issued Jun. 30, 1987, the teachings of which are incorporated herein by reference.

In practice, as is shown representationally in FIG. 6, the bales are positioned on receiving platform 30, string side up and cut side out, which is the same orientation in which they are traditionally stored and transported in the prior art. Thus, unlike the prior art method of cutting large bales, there is no need to reorient the bale to a string side out or cut side down position. They are then transported by the conventional and well known means to bale cutting station 42, where saw 36, typically a chain saw, is used to cut big bale 10 into slabs, as previously described. Cut slab 24 is then transferred, with baling twine 18 still intact on the outside perimeter of cut slab 24, across transfer platform 32 to slab cutting station 34. At slab cutting station 34, a second saw 38 is used to cut slab 26, each having a width of H/3 or, in this example, 17". Each of the cut blocks 28 then have a final dimensional configuration of a height of W/3, a width of H/3, and a length L. These cut blocks 28 can then either be cut in half so that each has a length of L/2, or, in the preferred embodiment, can be fed into a weighing device which cuts off a length of block based upon a predetermined weight set point, so that there is a uniform weight of material being fed into a recompression machine for the formation of uniform blocks of recompressed fibrous material.

As can be seen in FIGS. 5 and 6, the fibrous material in cut slab 24 has a reverse orientation from that of the cut slab of the prior art. In this case, the stem orientation 20 is vertical as opposed to horizontal, and the slab 24 is oriented cut side up. In effect, the two remaining baling twine wraps 18 hold together cut slab 24 as an independent bale during the transitionary period between its initial cutting from the big bale and its being recut into cut pieces.

Cut piece 28 is, like cut slab 24, oriented with the stem orientation 20 vertical, and the cut piece 28 having its cut side up. This is not the orientation which the prior art teaches as appropriate for rebating, in that the baling twine of the recompression machine will be wrapped around what is effectively the cut sides of the recompressed bale. This is against all the teachings of the prior art that this inventor is aware of. However, it has been found in practice that there is no noticeable increase in recompressed bale breakage caused by wrapping the recompressed bale around what would be its cut sides. It is thought that there are two factors which interplay to provide this favorable result. The first is that the stem orientation of the fibrous material within the big bales is not as uniform as that found in a prior art standard field small bale. Because of the size of the bale formation chambers in the big baling machines, there is room and movement sufficient to reorient a sufficient number of the stems of the fibrous material to provide a more homogeneous and random orientation of the stem material. Also, while the traditional field bale and the big bale are wrapped with twine, the twine wrappings are generally approximately 8" apart. However, with recompressed bales, due to the tremendous recoil forces and the large tensional forces required to hold the recompressed bale in compression, the twine wrappings are usually spaced at approximately 4" apart. It is believed that the increased homogeneous orientation of the stem material within the big bale, and this tight wrapping of bale twine at a generally 4" spacing, combines to enable the recompressed bales to be wrapped around its cut sides and still hold together.

There are a variety of saws which can be used to cut fibrous material, including, but not limited to, reciprocating saws, band saws and chain saws. In practice, it has been found that chain saws provide satisfactory performance. Lubricating oil for the chain saws is provided in the form of edible cooking oils, which serve to adequately lubricate the chain without contaminating the fibrous material with non-edible materials.

While there is shown and described the present preferred embodiment of the invention, it is to be distinctly understood that this invention is not limited thereto but may be variously embodied to practice within the scope of the following claims.

I claim:

1. A method of cutting a block of fibrous material for further recompression from a rectangular bale of fibrous material having longitudinal axis and having pairs of opposing string sides, cut sides, and ends, and further having at least two, generally parallel, spaced apart wrappings of baling twine, each wrapped around the ends and along the string sides of said bale generally parallel to the longitudinal axis of said bale, which comprises:

positioning the bale with a string side up;

cutting, generally parallel to the longitudinal axis and between two generally parallel wrappings of baling twine, a slab of predetermined width from the bale;

laying over the slab onto its side;

removing the baling twine from the slab;

cutting the slab into smaller pieces.

2. A method of cutting a block of fibrous material, having elongated stems, grass blades or stalks, for further recompression, from a rectangular bale of fibrous material having longitudinal axis and having pairs of opposing ends and string sides wherein the stems, grass blades or stalks, of the fibrous material are generally oriented parallel to each other and in a generally horizontal and transverse orientation to the longitudinal axis of the bale, said bale further having at least two, generally parallel, spaced apart wrappings of baling twine, each wrapped around the ends and along the string sides of said bale generally parallel to the longitudinal axis of said bale, which comprises:

positioning the bale with a string side up;

cutting, generally parallel to the longitudinal axis and between two generally parallel wrappings of baling twine, a slab of predetermined width from the bale;

laying over the slab onto its side;

removing the baling twine from the slab;

cutting the slab into smaller pieces.

\* \* \* \* \*